(12) United States Patent
Huang

(10) Patent No.: US 8,054,297 B2
(45) Date of Patent: Nov. 8, 2011

(54) TOUCH DISPLAY PANEL

(75) Inventor: Kuei-Wei Huang, Taipei (TW)

(73) Assignee: Chunghwa Picture Tubes, Ltd., Taoyuan (TW)

( * ) Notice: Subject to any disclaimer, the term of this patent is extended or adjusted under 35 U.S.C. 154(b) by 539 days.

(21) Appl. No.: 12/339,079

(22) Filed: Dec. 19, 2008

(65) Prior Publication Data

US 2010/0103119 A1 Apr. 29, 2010

(30) Foreign Application Priority Data

Oct. 29, 2008 (TW) ................................ 97141642 A

(51) Int. Cl.
G06F 3/041 (2006.01)

(52) U.S. Cl. ...................................................... 345/173

(58) Field of Classification Search .................. 345/173, 345/104, 156; 349/12, 155, 139
See application file for complete search history.

(56) References Cited

U.S. PATENT DOCUMENTS

| 6,057,903 | A * | 5/2000 | Colgan et al. ................. 349/139 |
| 6,177,706 | B1 * | 1/2001 | Shindo et al. ................. 257/347 |
| 6,177,918 | B1 * | 1/2001 | Colgan et al. ................. 345/87 |
| 6,225,668 | B1 * | 5/2001 | Shindo et al. ................. 257/368 |
| 6,677,214 | B1 * | 1/2004 | Shindo et al. ................. 438/365 |
| 6,891,530 | B2 * | 5/2005 | Umemoto et al. ............ 345/173 |
| 7,053,968 | B2 * | 5/2006 | Hong et al. ..................... 349/12 |
| 7,075,521 | B2 * | 7/2006 | Yamamoto et al. ........... 345/173 |
| 7,274,424 | B1 * | 9/2007 | Kurihara et al. .............. 349/155 |
| 7,825,894 | B2 * | 11/2010 | Park et al. ..................... 345/104 |

FOREIGN PATENT DOCUMENTS

| JP | 11184396 | 7/1999 |
| JP | 200142296 | 2/2001 |

* cited by examiner

*Primary Examiner* — Fred Tzeng
(74) *Attorney, Agent, or Firm* — Jianq Chyun IP Office

(57) ABSTRACT

A touch display panel includes a first substrate, a second substrate, a third substrate, a liquid crystal layer disposed between the second and the third substrates, a pixel array disposed between the liquid crystal layer and the third substrate, an opposite electrode, color filter patterns, a first sensing electrode, and a second sensing electrode. The first, the second, and the third substrates are disposed in parallel. The color filter patterns and the opposite electrode that are disposed between the liquid crystal layer and the second substrate are respectively disposed on opposite sides of the second substrate. Some color filter patterns are piled to form touch points. The first sensing electrode on the first substrate faces the second substrate. The second sensing electrode covers the touch points and some color filter patterns. A height of the touch points is less than a gap between the first and the second substrates.

13 Claims, 2 Drawing Sheets

TOUCH DISPLAY PANEL

CROSS-REFERENCE TO RELATED APPLICATION

This application claims the priority benefit of Taiwan application serial no. 97141642, filed on Oct. 29, 2008. The entirety of the above-mentioned patent application is hereby incorporated by reference herein and made a part of specification.

BACKGROUND OF THE INVENTION

1. Field of the Invention

The present invention relates to a touch display panel, and more particularly to a touch display panel in which touch points are not required to be additionally disposed.

2. Description of Related Art

Information technologies (ITs), wireless mobile communications, and information home appliances have been rapidly developed and widely applied in recent years. To meet current demands on portable, compact, and user-friendly IT products, touch panels have been introduced as input devices in replacement of conventional input devices, such as keyboards or mice. Besides, to increase dimensions of display screens and facilitate touch control functions, it is prevalent to combine the touch panels and display panels at this current stage.

In general, a touch panel is formed by two substrates, a sensing electrode, and spacers. The sensing electrode and the spacers are disposed between the two substrates. Additionally, a display panel is formed by two substrates, a pixel array, and a liquid crystal layer, given that the display panel is a liquid crystal display (LCD) panel. Here, the pixel array and the liquid crystal layer are disposed between the two substrates. The touch panel and the display panel can be bonded together by directly adhering the touch panel onto the display panel. However, with said design, the entire thickness of the finished product cannot be reduced.

In order to thin out the touch display panel, a design in which a touch device is formed on one piece of glass in a display panel was proposed. That is to say, said design allows the display panel and the touch panel to share one of the substrates (i.e. a common substrate). The spacers and the sensing electrode are formed on the common substrate, so as to form the touch display panel equipped with the common substrate and the other one of the substrates. Nonetheless, the spacers must be additionally scattered or manufactured, which complicates manufacturing processes of the touch display panel.

SUMMARY OF THE INVENTION

The present invention is directed to a touch display panel for simplifying complicated manufacturing processes of a conventional touch display panel.

In the present invention, a touch display panel including a first substrate, a second substrate, a third substrate, a liquid crystal layer, a pixel array, an opposite electrode, a plurality of color filter patterns, a first sensing electrode, and a second sensing electrode is provided. The first substrate, the second substrate, and the third substrate are disposed in parallel. The second substrate is disposed between the first substrate and the third substrate. The liquid crystal layer is disposed between the second substrate and the third substrate. The pixel array is disposed between the liquid crystal layer and the third substrate. The opposite electrode is disposed between the second substrate and the liquid crystal layer. The color filter patterns and the opposite electrode are respectively disposed on opposite sides of the second substrate, and parts of the color filter patterns are piled to form a plurality of touch points. The first sensing electrode is disposed on the first substrate and faces the second substrate. The second sensing electrode covers the touch points and parts of the color filter patterns. Here, a height of the touch points is less than a gap between the first substrate and the second substrate.

In an embodiment of the present invention, parts of the color filter patterns are piled to further form a plurality of spacers. The second sensing electrode exposes the spacers, for example. Besides, the spacers allow the gap to exist between the first substrate and the second substrate. Moreover, the touch display panel further includes a black matrix pattern disposed on one side of the second substrate. Said side of the second substrate faces the first substrate. Here, the black matrix pattern has a plurality of openings. Parts of the color filter patterns which are not piled are located in the openings. The touch points and the spacers are disposed on the black matrix pattern. Practically, a height of the spacers can be greater than the height of the touch points.

In an embodiment of the present invention, the color filter patterns include a plurality of red filter patterns, a plurality of green filter patterns, and a plurality of blue filter patterns. Parts of the touch points can be constituted by piling one of the red filter patterns and one of the green filter patterns. In an alternative, parts of the touch points can be constituted by piling one of the blue filter patterns and one of the green filter patterns. Certainly, parts of the touch points can also be constituted by piling one of the red filter patterns and one of the blue filter patterns. In addition to the above, each of the spacers is, for example, constituted by piling one of the red filter patterns, one of the blue filter patterns, and one of the green filter patterns.

In an embodiment of the present invention, the touch display panel further includes a plurality of cell spacers disposed between the second substrate and the third substrate, so as to allow a cell gap to exist between the second substrate and the third substrate. The cell spacers are, for example, a plurality of ball-shaped spacers or a plurality of photoresist spacers.

In an embodiment of the present invention, the first substrate, the second substrate, and the third substrate are transparent substrates, respectively.

In an embodiment of the present invention, the first substrate is a flexible transparent substrate, for example.

In the present invention, the color filter patterns are piled to form the touch points, and therefore it is not necessary to additionally form touch points in the touch display panel of the present invention. Namely, in the touch display panel of the present invention, the color filter patterns for display and the touch points are fabricated simultaneously, so as to simplify the manufacturing processes of the entire touch display panel. Moreover, in the touch display panel of the present invention, color filter layers can be piled to form the spacers of the touch panel, so as to ensure that a gap exists in the touch panel. As such, the color filter patterns, the touch points, and the spacers in the touch display panel of the present invention can be fabricated at the same time, thus simplifying the manufacturing processes.

To make the above and other features and advantages of the present invention more comprehensible, several embodiments accompanied with figures are detailed as follows.

BRIEF DESCRIPTION OF THE DRAWINGS

The accompanying drawings constituting a part of this specification are incorporated herein to provide a further understanding of the invention. Here, the drawings illustrate embodiments of the invention and, together with the description, serve to explain the principles of the invention.

DESCRIPTION OF EMBODIMENTS

Figure 1A:
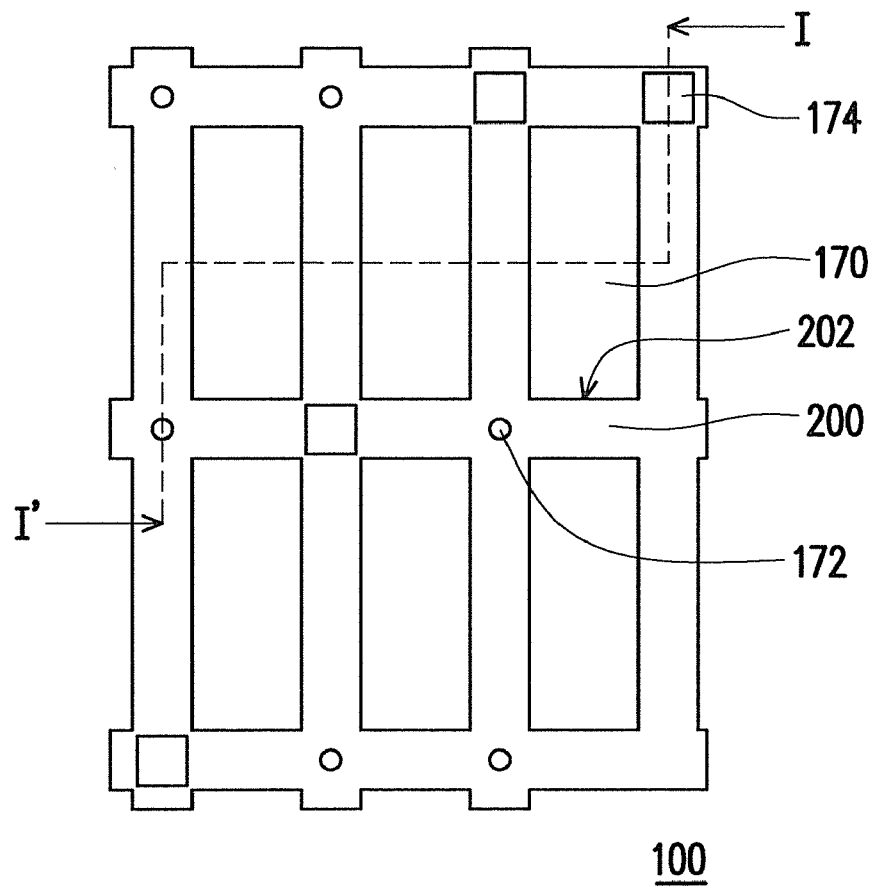
FIG. 1A is a schematic top view of a touch display panel according to an embodiment of the present invention.
Figure 1B:
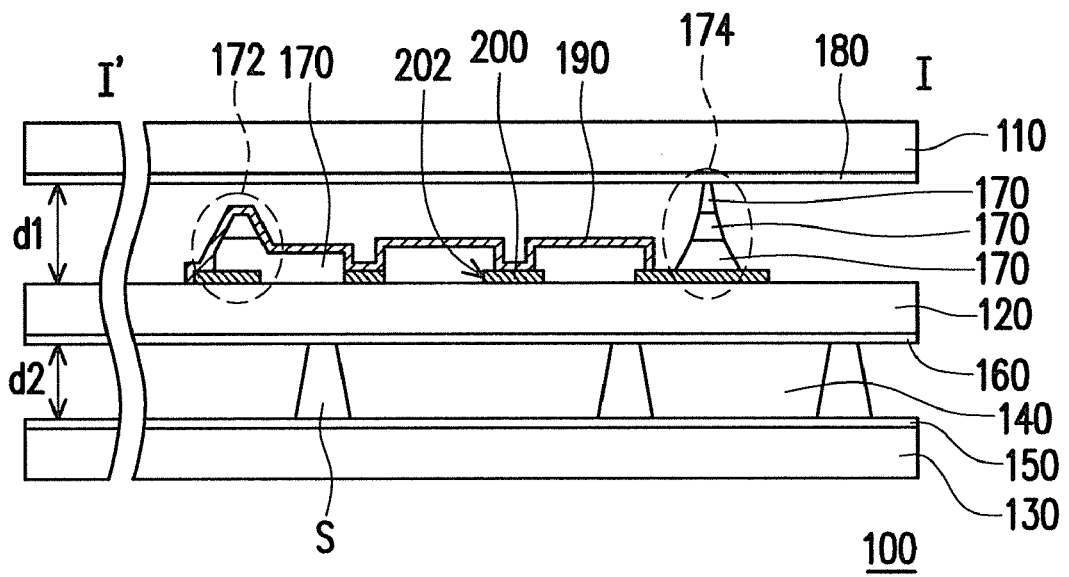
FIG. 1B is a cross-sectional view taken along a section line I-I' depicted in FIG. 1A.

FIG. 1A is a schematic top view of a touch display panel according to an embodiment of the present invention. FIG. 1B is a cross-sectional view taken along a section line I-I' depicted in FIG. 1A. Referring to FIGS. 1A and 1B, a touch display panel 100 includes a first substrate 110, a second substrate 120, a third substrate 130, a liquid crystal layer 140, a pixel array 150, an opposite electrode 160, a plurality of color filter patterns 170, a first sensing electrode 180, and a second sensing electrode 190. The first substrate 110, the second substrate 120, and the third substrate 130 are disposed in parallel. The second substrate 120 is disposed between the first substrate 110 and the third substrate 130. The liquid crystal layer 140 is disposed between the second substrate 120 and the third substrate 130. The pixel array 150 is disposed between the liquid crystal layer 140 and the third substrate 130. The opposite electrode 160 is disposed between the liquid crystal layer 140 and the second substrate 120.

Additionally, the color filter patterns 170 and the opposite electrode 160 are respectively disposed on opposite sides of the second substrate 120. That is to say, the color filter patterns 170 substantially face the first substrate 110, and the opposite electrode 160 faces the third substrate 130. Parts of the color filter patterns 170 are piled to form a plurality of touch points 172. The first sensing electrode 180 is disposed on the first substrate 110 and faces the second substrate 120. The second sensing electrode 190 covers the touch points 172 and parts of the color filter patterns 170. Here, a height of the touch points 172 is less than a gap d1 between the first substrate 110 and the second substrate 120.

Besides, in order to ensure that a cell gap d2 exists between the second substrate 120 and the third substrate 130, the touch display panel 100 of the present embodiment further includes a plurality of cell spacers S disposed between the second substrate 120 and the third substrate 130. The cell spacers S are, for example, a plurality of ball-shaped spacers or a plurality of photoresist spacers.

Generally, the color filter patterns 170 are disposed between the second substrate 120 and the opposite electrode 160. Nevertheless, inconsistent thickness of the color filter patterns 170 frequently affects other film layers. For example, flatness of an alignment layer (not shown) is likely to be affected during the formation of the alignment layer, thus resulting in unfavorable quality of other film layers. Accordingly, in the present embodiment, the color filter patterns 170 and the opposite electrode 160 are respectively disposed on opposite sides of the second substrate 120, so as to prevent flatness of other film layers on the second substrate 120 from being affected due to the inconsistent thickness of the color filter patterns 170. On the other hand, parts of the color filter patterns 170 can be further piled to form the touch points 172, which is conducive to simplifying manufacturing processes of the touch display panel 100.

In the present embodiment, the first substrate 110, the second substrate 120, and the third substrate 130 are transparent substrates. In addition, the first substrate 110 is, for example, a flexible transparent substrate. As such, a user can use fingers or other media to press the first substrate 110 for controlling the same. According to the present embodiment, a height of the touch points 172 is greater than the color filter patterns 170 that are not piled yet. Hence, when the first substrate 110 is pressed and bent, the first sensing electrode 180 on the first substrate 110 is merely conducted to the second sensing electrode 190 covering the touch points 172. Here, signals generated by way of conducting the first sensing electrode 180 and the second sensing electrode 190 can be converted to corresponding instructions, so as to complete the touch-control motion.

In the present embodiment, the first sensing electrode 180 is merely conducted with the second sensing electrode 190 covering the touch points 172. Thus, erroneous sensing is not apt to occur. Meanwhile, it is not necessary to form the touch points 172 by performing additional manufacturing processes, thereby simplifying the fabrication of the touch display panel 100 according to the present embodiment. Moreover, parts of the color filter patterns 170 of the present embodiment can be further piled to form a plurality of spacers 174. The spacers 174 allow the gap d1 to exist between the first substrate 110 and the second substrate 120. In other words, a height of the spacers 172 can be greater than the height of the touch points 172. Here, given that the first substrate 110 is not pressed, the first sensing electrode 180 and the second sensing electrode 190 can be properly insulated from each other. Thereby, no erroneous sensing or noises would occur.

Practically, the spacers 174 are exactly disposed between the first substrate 110 and the second substrate 120, and the spacers 174 support the first substrate 110. When the second sensing electrode 190 covers the spacers 174, the first sensing electrode 180 and the second sensing electrode 190 remain conducted. Therefore, the second sensing electrode 190, for example, exposes the spacers 174, such that the first sensing electrode 180 and the second sensing electrode 190 can be conducted with each other only when the user presses the touch display panel 100 and appropriately performs the touch-control function and the sensing function.

Moreover, the touch display panel 100 further includes a black matrix pattern 200 disposed on one side of the second substrate 120. Said side of the second substrate 120 faces one side of the first substrate 110. The black matrix pattern 200 is substantially disposed between the second substrate 120 and the color filter patterns 170. Here, the black matrix pattern 200 has a plurality of openings 202, and parts of the color filter patterns 170 which are not piled are located within the openings 202. The touch points 172 and the spacers 174 are disposed on the black matrix pattern 200.

In the present embodiment, the color filter patterns 170 include a plurality of red filter patterns, a plurality of green filter patterns, and a plurality of blue filter patterns. Certainly, in other embodiments, the color filter patterns 170 can also be constituted by color filter patterns with other colors. Besides, the touch points 172 of the present embodiment are, for example, formed by piling two color filter patterns 170. For instance, parts of the touch points 172 can be constituted by piling one of the red filter patterns and one of the green filter patterns. In an alternative, parts of the touch points 172 can be constituted by piling one of the blue filter patterns and one of the green filter patterns. It is certain that parts of the touch points 172 can also be constituted by piling one of the red filter patterns and one of the blue filter patterns. In addition to the above, each of the spacers 174 is, for example, constituted by piling one of the red filter patterns, one of the blue filter patterns, and one of the green filter patterns.

According to the present embodiment, the color filter patterns 170 with different colors can be piled to form the touch points 172 and the spacers 174. As such, the fabrication of the touch points 172 and the spacers 174 does not complicate the manufacturing processes of the color filter patterns 170. For instance, a manufacturing method of the color filter patterns 170 in the present embodiment is described hereinafter.

Figure 1C:
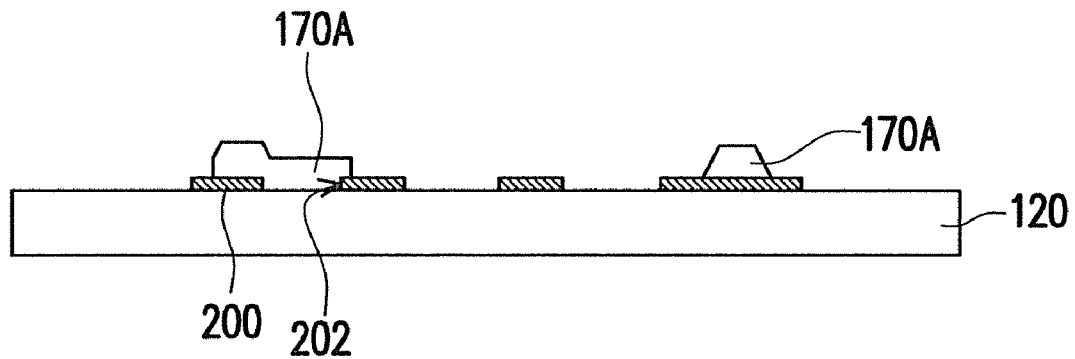
FIGS. 1C through 1E are flowcharts of manufacturing color filter patterns according to an embodiment of the present invention.
Figure 1D:
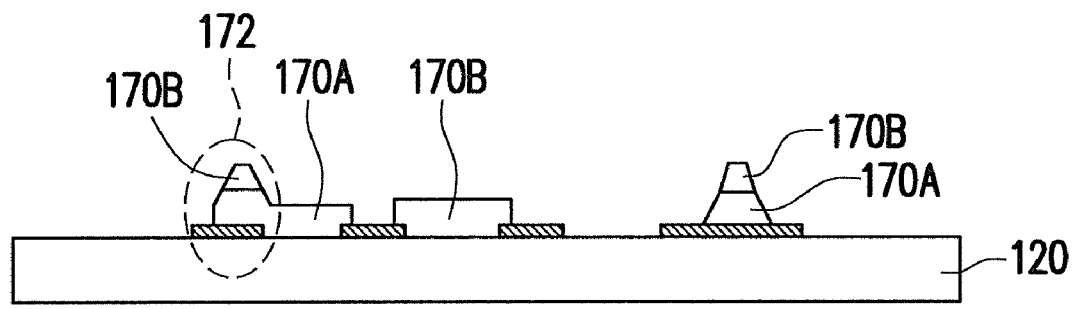
Figure 1E:
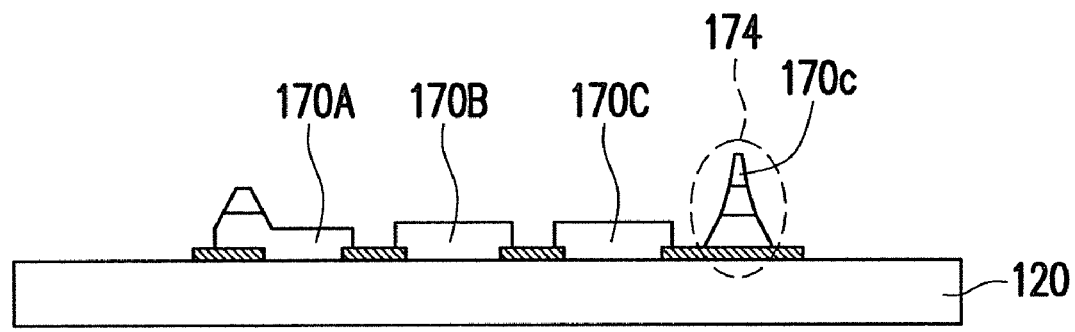

FIGS. 1C through 1E are flowcharts of manufacturing color filter patterns according to an embodiment of the present invention. Referring to FIG. 1C, first color filter patterns 170A are formed on the second substrate 120 on which the black matrix pattern 200 has been formed. Parts of the first color filter patterns 170A are disposed in some of the openings 202. In other words, none of the first color filter patterns 170A is disposed in the other openings 202. Additionally, parts of the first color filter patterns 170A are disposed on the black matrix pattern 200.

Next, referring to FIG. 1D, second color filter patterns 170B are formed on the second substrate 120. Parts of the second filter patterns 170B are located in some of the openings which are not filled with the first color filter patterns 170A. Here, some of the openings 202 are neither filled with the first color filter patterns 170A nor filled with the second color filter patterns 170B. Besides, some of the second color filter patterns 170B are directly piled on the first color filter patterns 170A disposed on the black matrix pattern 200, so as to form the touch points 172 at the same time. Namely, during the fabrication of the second color filter patterns 170B, the touch points 172 are also manufactured.

After that, referring to FIG. 1E, third color filter patterns 170C are formed on the second substrate 120. The unfilled openings 202 are filled with parts of the third color filter patterns 170C. Other parts of the third color filter patterns 170C are disposed on the parts of the second color filter patterns 170B above the black matrix pattern 200, so as to form the spacers 174. In the above manufacturing process of the color filter patterns 170A~170C, not only the color filter patterns 170A~170C for display are formed, but also the touch points 172 and the spacers 174 are formed. Namely, the manufacturing process of the touch points 172 and the spacers 174 is completely compatible with that of the color filter patterns 170A~170C and does not complicate the fabrication of the touch display panel 100.

Certainly, in other embodiments, the touch points 172 can also be formed by piling the second color filter patterns 170B and the third color filter patterns 170C or by piling the first color filter patterns 170A and the third color filter patterns 170C. That is to say, during the fabrication of the touch points 172, the third color filter patterns 170C can be selectively disposed directly on the first color filter patterns 170A or the second color filter patterns 170B which is located above the black matrix pattern 200.

In light of the foregoing, the touch points for performing the touch-control function and the sensing function and the spacers for allowing the gap to exist between the substrates are manufactured by means of the color filter patterns according to the present invention. That is to say, the touch display panel of the present invention does not require additional processes for manufacturing the touch points, which is conducive to simplifying the manufacturing processes. In the meantime, the color filter patterns of the present invention are disposed on one side of the second substrate which is away from the liquid crystal layer. Thereby, other film layers disposed between the liquid crystal layer and the second substrate would not be affected by inconsistency height of the color filter patterns. Accordingly, reliability of film layers including the alignment layer can be improved by applying the touch display panel of the present invention.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A touch display panel, comprising:
a first substrate;
a second substrate;
a third substrate, wherein the first substrate, the second substrate, and the third substrate are disposed in parallel, and the second substrate is disposed between the first substrate and the third substrate;
a liquid crystal layer, disposed between the second substrate and the third substrate;
a pixel array, disposed between the liquid crystal layer and the third substrate;
an opposite electrode, disposed between the second substrate and the liquid crystal layer;
a plurality of color filter patterns, wherein the plurality of color filter patterns and the opposite electrode are respectively disposed on opposite sides of the second substrate, and parts of the plurality of color filter patterns are piled to form a plurality of touch points;
a first sensing electrode, disposed on the first substrate and facing the second substrate; and
a second sensing electrode, covering the plurality of touch points and parts of the plurality of color filter patterns, wherein a height of the plurality of touch points is less than a gap between the first substrate and the second substrate.

2. The touch display panel as claimed in claim 1, wherein parts of the plurality of color filter patterns are further piled to form a plurality of spacers exposed by the second sensing electrode, and the plurality of spacers allows the gap to exist between the first substrate and the second substrate.

3. The touch display panel as claimed in claim 2, further comprising a black matrix pattern disposed on one side of the second substrate facing the first substrate, the black matrix pattern comprising a plurality of openings, wherein parts of the plurality of color filter patterns which are not piled are located in the plurality of openings, and the plurality of touch points and the plurality of spacers are disposed on the black matrix pattern.

4. The touch display panel as claimed in claim 2, wherein a height of the plurality of spacers is greater than the height of the plurality of touch points.

5. The touch display panel as claimed in claim 2, wherein the plurality of color filter patterns comprises a plurality of red filter patterns, a plurality of green filter patterns, and a plurality of blue filter patterns.

6. The touch display panel as claimed in claim 5, wherein parts of the plurality of touch points are formed by piling one of the plurality of red filter patterns and one of the plurality of green filter patterns.

7. The touch display panel as claimed in claim 5, wherein parts of the plurality of touch points are formed by piling one of the plurality of blue filter patterns and one of the plurality of green filter patterns.

8. The touch display panel as claimed in claim 5, wherein parts of the plurality of touch points are formed by piling one of the plurality of red filter patterns and one of the plurality of blue filter patterns.

9. The touch display panel as claimed in claim 5, wherein each of the plurality of spacers is formed by piling one of the plurality of red filter patterns, one of the plurality of green filter patterns, and one of the plurality of blue filter patterns.

10. The touch display panel as claimed in claim 1, further comprising a plurality of cell spacers disposed between the second substrate and the third substrate, the plurality of cell spacers allowing a cell gap to exist between the second substrate and the third substrate.

11. The touch display panel as claimed in claim 10, wherein the plurality of cell spacers is a plurality of ball-shaped spacers or a plurality of photoresist spacers.

12. The touch display panel as claimed in claim 1, wherein the first substrate, the second substrate, and the third substrate are transparent substrates, respectively.

13. The touch display panel as claimed in claim 1, wherein the first substrate is a flexible transparent substrate.

\* \* \* \* \*